April 15, 1969  C. C. RIPLEY  3,438,856
NUCLEAR REACTOR HYDRAULIC CONTROL DRIVE SYSTEM
Filed Dec. 29, 1967  Sheet 1 of 2
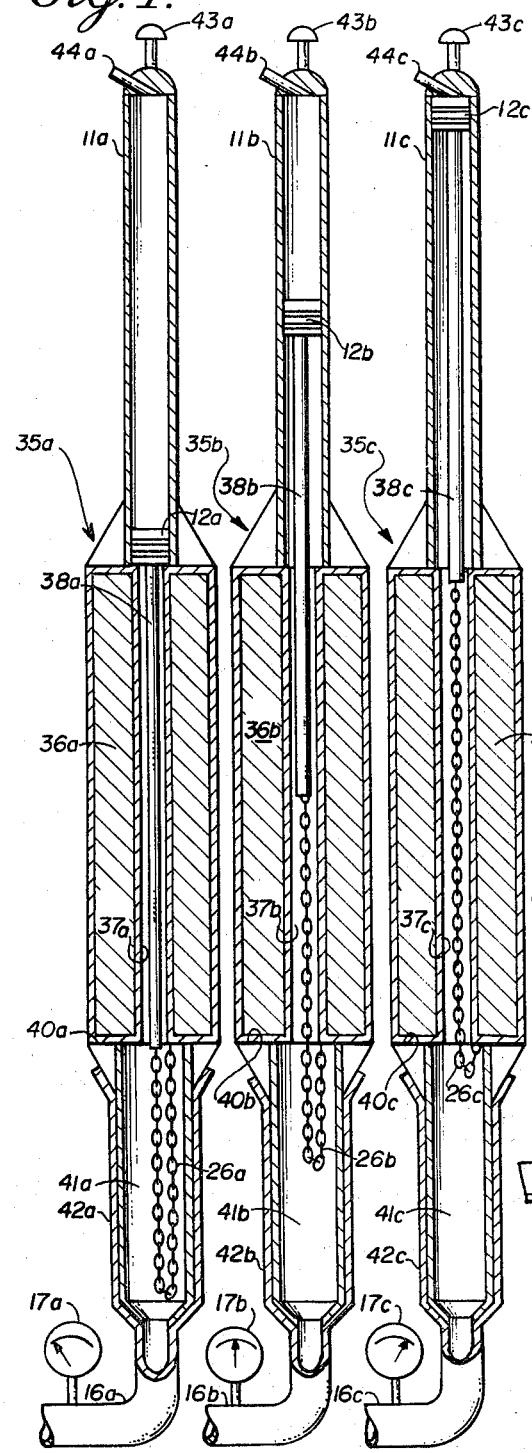
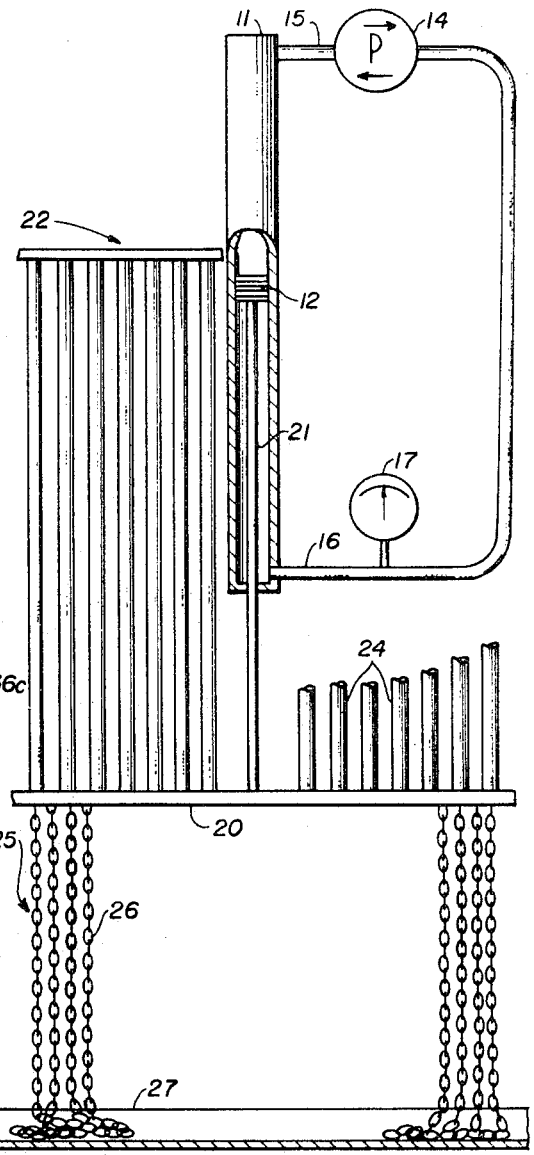
INVENTOR.
CHARLES C. RIPLEY
BY Roland A. Anderson
ATTORNEY

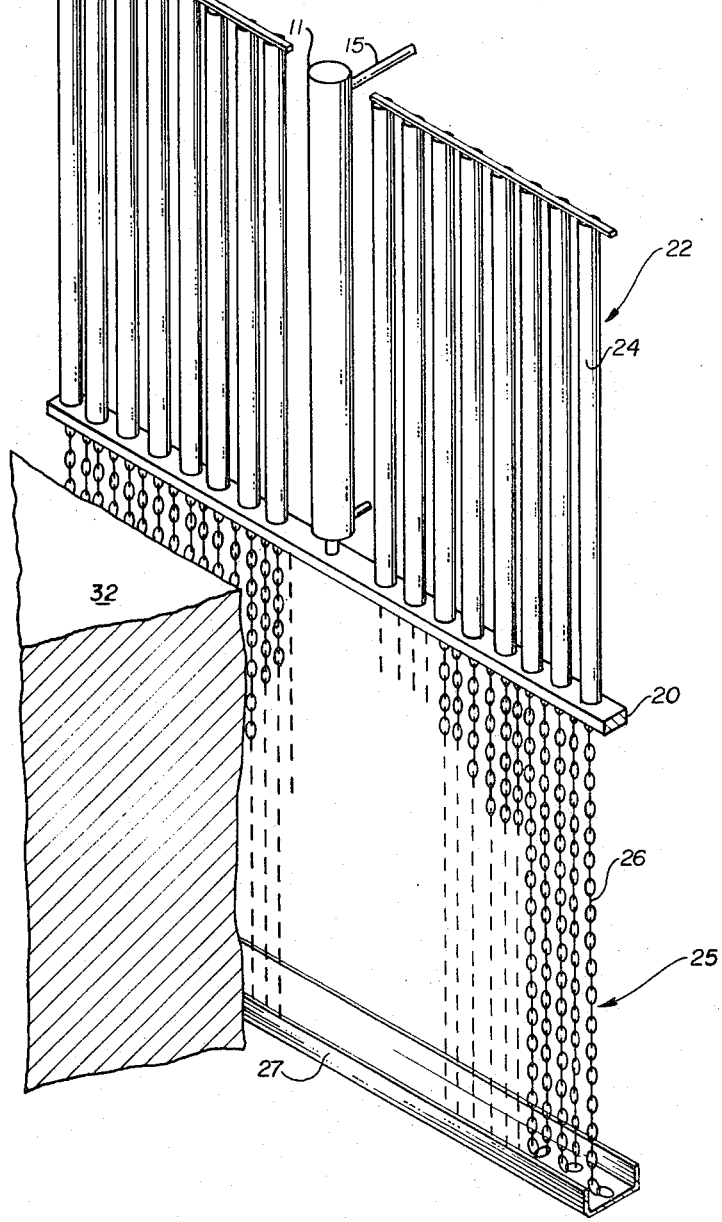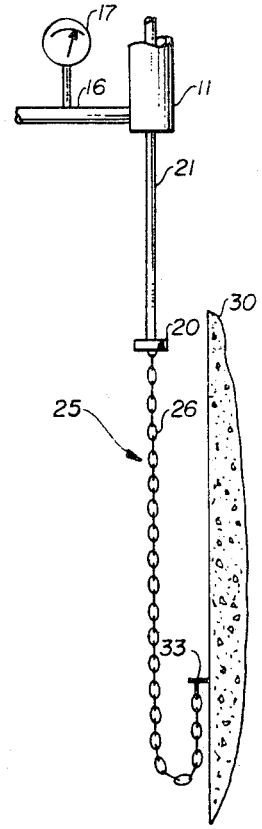
INVENTOR.
CHARLES C. RIPLEY
BY Roland A. Anderson
ATTORNEY

United States Patent Office 3,438,856
Patented Apr. 15, 1969

3,438,856
NUCLEAR REACTOR HYDRAULIC CONTROL
DRIVE SYSTEM
Charles C. Ripley, San Jose, Calif., assignor to the United States of America as represented by the United States Atomic Energy Commission
Filed Dec. 29, 1967, Ser. No. 694,536
Int. Cl. G21c 19/00, 7/08, 7/10
U.S. Cl. 176—29                                     8 Claims

ABSTRACT OF THE DISCLOSURE

Nuclear reactor control system in which a horizontal bar connected to a hydraulic actuated piston in a vertically disposed cylindrical tube supports and positions a curtain of neutron reflecting chains within a nuclear reactor core to regulate reactivity. A plurality of neutron absorbing rods are mounted on the top of the beam also to be positioned within the reactor core to regulate reactivity. A pressure gauge calibrated in units of length relevant to the weight of chain being lifted by the beam indicates the vertical position of the beam. The remainder of the chain rests on a tray or the bottom end of the curtain chain is attached to a supporting wall.

Background of the invention

The invention disclosed herein was made in the course of or under, Contract No. AT(04-3)-189, Project Agreement No. 47 with the United States Atomic Energy Commission.

This invention relates generally to nuclear reactors and systems for testing, sensing, measuring, monitoring or detecting of reactor conditions with control of the reactor by altering the quantity or quality of the fuel within the critical area and by movement of control elements and in particular to sensing or detecting devices associated with control rods or control rod motivating apparatus.

The neutron flux control devices of the prior art, for the most part, are of three types: the first, where a neutron poison rod is inserted into the fissile fuel zone to absorb neutrons and thereby reduce reactivity; the second, where fissile fuel is removed from the core or fissile fuel zone to reduce reactivity; and the third, where a neutron reflector material is placed about the periphery of the core or fissile fuel zone to reflect neutrons back into the core to increase reactivity or is removed to reduce reactivity. These devices usually are singular in function, i.e., only the control rod or neutron reflector is raised or lowered into and out of the neutron flux. In particular, when a neutron absorbing control rod of the prior art is removed from a fuel element nothing is inserted in the fuel element to take its place and, therefore, during reactor operation a void which lowers power density is created. Concomitantly, a relatively limited usage, i.e., single effect utilization, of the control rod volume of the reactor is attained.

For the neutron reflectors of the prior art, when they are removed, an inert void remains also with poor utilization of the volume needed to accommodate the control reflector. Also with this arrangement, greater shielding of the reactor is required with a resulting higher capital cost.

Furthermore, the apparatus of the prior art for motivating the control systems into and out of the reactor neutron flux are generally mechanically, i.e., they utilize cables and drums, lead screws or push-rods with position indicating devices mounted either on the cable, drum, lead screw or push-rod or mechanically linked thereto. In all cases, constant monitoring and maintenance of the mechanical parts of the prior art control drive devices is required, not to mention the precise machining and design, to prevent leakage of dangerous radioactive materials and jamming of the control device which would endanger the operation of the reactor. In addition, the position indicating devices of the prior art measure only discrete incremental units of distance that the control rod traveled and not a contiuum of distance which is necessary for accurate reactor control.

Summary of the invention

The present invention improves on the prior art devices by providing a control drive system utilizing a force transmitting fluid, i.e., a hydraulic system for raising and lowering a limber reactivity modifying element, which is either a limber reactivity enhancing element or a limber reactivity reducing element into and out of the neutron flux of the reactor core followed above it and is replaced, in its travel, by a rigid reactivity modifying element of opposite reactivity characteristic to the limber element so that, for example, as the limber reactivity enhancing device is proportionally removed from the neutron flux, it is by the same proportion replaced by a rigid reactivity reducing element. Likewise, as the case may be, the limber reactivity reducing element is proportionally removed from the neutron flux, it is by the same proportion replaced by a rigid reactivity enhancing element. The bottom end of the limber element is either attached to a supporting wall or collected in a tray at the base of or below the core. The term "limber element" is defined herein as an element having little or no columnar strength in compression.

The elevated position of the limber reactivity modifying element is measured according to the weight of the limber element being carried by the hydraulic control drive system at the particular elevated position.

It is, therefore, an object of this invention to provide a neutron flux control apparatus for a nuclear reactor in which a reactivity enhancing element is used in association with a reactivity reducing element.

It is another object of this invention to provide a neutron flux control apparatus for a nuclear reactor in which a limber reactivity modifying element is used in association with a rigid reactivity modifying element having opposite reactivity modifying characteristics.

It is a further object of this invention to provide a neutron flux control apparatus for a nuclear reactor in which the position of the neutron modifying elements is measured by the weight of the limber reactivity modifying element carried at the measured position.

It is still a further object of this invention to provide a neutron flux control apparatus for a nuclear reactor in which the position of the limber reactivity modifying element is measured by the pressure carried by the force transmitting fluid used for raising and lowering the reactivity modifying elements.

Other and more particular objects of this invention will be manifest upon study of the following detailed description when taken together with the accompanying drawings.

Brief description of the drawings

FIGURE 1 is a schematic illustration of the apparatus of this invention showing the limber and rigid reactivity modifying elements and their cooperation with the force transmitting fluid drive and pressure measuring system;

FIGURE 2 is an illustration of a modified embodiment of the present invention showing the attachment of the end of the limber reactivity modifying element to a supporting wall;

FIGURE 3 is an isometric view of the limber and rigid reactivity modifying elements assembled as a neutron reflector control apparatus; and FIGURE 4 is an illustration of a second embodiment of the control system of this invention showing a longitudinal section through a group of three fuel elements and the apparatus of the present invention.

*Description of the preferred embodiment*

Referring to FIGURE 1, the neutron control apparatus of this invention comprises basically, a rigid reactivity modifying element 22 mounted above a limber reactivity modifying element 25 of opposite reactivity modifying characteristic, both of which are raised and lowered by a piston 12 in a cylinder 11 by a force transmitting fluid motivated by a reversible pump 14.

In particular, the neutron control apparatus of this invention comprises, a cylindrical tube 11 vertically arranged with a piston 12 slidable therein and a reversible pump 14 communicating with the upper and lower ends of cylindrical tube 11 through conduits 15 and 16 respectively for raising and lowering piston 12, and a pressure gauge 17 communicating with the lower end of cylindrical tube 11.

A horizontal beam 20 is connected to piston 12 by connecting rod 21. Mounted on top of horizontal beam 20 is a rigid reactivity modifying element 22 which, for the embodiment illustrated comprises a plurality of neutron absorbing rods 24.

Depending from the bottom of beam 20 is a limber reactivity modifying element 25 which, for the embodiment illustrated comprises a plurality of catenas 26 of reactivity modifying elements, in particular, a chain having links comprising a neutron reflective material.

A tray 27 is arranged below limber element 25 to collect or accumulate the chain or catena 26 as beam 20 is lowered. Instead of a tray 27, each catena 26 of limber element 25 may be attached at its lower end to a supporting wall 30 as illustrated in FIGURE 2.

FIGURE 3 illustrates the neutron control apparatus of the present invention in relation to a nuclear reactor core 32 for a nuclear reactor in which reflection of neutrons is used to increase or decrease reactivity.

Cylindrical tube 11 is arranged above core 32 with tray 27 at the base of or below core 32 so that horizontal beam 20 will sweep the full vertical length of core 32 as close as possible thereto and within the neutron flux radiating therefrom.

To operate the neutron control apparatus illustrated in FIGURES 1, 2 and 3, pump 14 is operated to pump the force transmitting fluid from the bottom of cylinder 11 to the top of cylinder 11 through conduits 16 and 15 respectively to cause piston 12 to descend, lowering beam 20, rigid element 22 and limber element 25. With beam 20 in its lowermost position, rigid element 22, comprising neutron absorbing rods 24 will be fully exposed to the neutron flux from core 32 (FIGURE 3) so that no neutrons will be reflected or returned into core 32, thus, in accordance with principles well known in the art, core 32 will be at its lowest reactivity level.

Also, when beam 20 is at its lowest point, all or nearly all of limber element 25 will be collected in tray 27. Pressure gauge 17 which measures the weight carried by piston 12 is calibrated for this position, to read zero.

Pump 14 is now operated to pump force transmitting fluid from the top of cylinder 11 into the bottom of cylinder 11 through conduits 15 and 16 respectively thus causing piston 12 to ascend, pulling up beam 20 and limber element 25 from its pile in tray 27.

As beam 20 rises, a proportionally greater amount of limber element 25 is exposed to the neutron flux radiating from core 32. In the present embodiment, limber element 25 is made of a neutron reflective material so that as beam 20 rises and greater proportion of limber element 25 is exposed to the neutron flux from core 32, a greater proportion of neutrons will be reflected back into the core to increase the reactivity therein in accordance with principles well known in the art. Thus, as neutron absorbing material, i.e., rigid element 22 is removed from the neutron flux field, a neutron reflective material is proportionally added. In more general terms, as a reactivity reducing element is removed from the neutron flux field a reactivity enhancing element is proportionally added to the field.

When piston 12 is at the top of cylinder 11, all of rigid element 22 (the neutron absorber) is removed from the neutron flux field of core 32 and all of limber element 25 (the neutron reflector) substituted therefore. In this position, the maximum reflection of neutrons is achieved with the result that maximum reactivity is achieved in core 32 in accordance with principles well known in the art.

When piston 12 is at the top of cylinder 11, all of chain (catena) 26 in limber element 25 is extended so that beam 20 now carries its entire weight. The weight of limber element 25 is transmitted to piston 12 through connecting rod 21 to exert a force on the force transmitting fluid increasing the pressure therein in the fluid below piston 12 and in conduit 16. Pressure gauge 17, which measures the pressure in conduit 16, is now calibrated to read either 100% or the number constituting the maximum distance traveled by beam 20.

If beam 20 has been lifted only halfway up, as seen in FIGURE 1, only one-half the weight of limber element 25 is carried by the beam so that the reading on pressure gauge 17 will be one-half of the maximum reading when beam 20 is at its maximum height.

A different arrangement is illustrated in FIGURE 2 where the bottom end of chain or catena 26 is attached to supporting wall 30. When beam 20 is raised to full height, chain or catena 26 is extended to its full length and its entire weight is carried by beam 20. When beam 20 is lowered to where it is at the same elevation as the point of attachment 33 of the bottom end of chain or catena 26, beam 20 will then carry one-half the weight of chain 26 while supporting wall 30 will carry the other half. Pressure gauge 17 will measure some pressure due to the weight of one-half of chain 26 but this point may be calibrated to read zero. As beam 20 is raised, a proportionally greater amount of chain 26 will be carried by beam 20 and thereby increase the pressure in the force transmitting fluid in conduit 16 and thus the pressure reading on gauge 17. Thus, the pressure indication on pressure gauge 17 is proportional to the vertical position of beam 20 in a manner similar to that previously described for FIGURE 1.

A second embodiment of the present invention is illustrated in FIGURE 4. In this embodiment, the apparatus of the present invention is used within a core of fuel elements of which three are illustrated and distinguished in the reference numerals by the suffixes *a*, *b* and *c* corresponding, respectively to the left, middle and right fuel elements. When referring generally to the common element of all fuel elements and apparatus of the present invention, the suffix letter will be omitted. The elements of the present invention which are common to this and the previously described embodiment will carry the same reference numeral.

All fuel elements 35 comprise a fissile fuel section 36 having a channel 37 centrally therethrough with previously described cylinder 11 and piston 12 therein mounted above fissile fuel section 36. Channels are provided (not shown) through fissile fuel section 36 for the flow of coolant therethrough of design common in the art. Rigid reactivity modifying element 38 is connected to piston 12 and is arranged to be freely slidable within channel 37 and the neutron flux field of fissile fuel section 36. In the present embodiment, rigid element 38 is a neutron absorbing control rod.

At the bottom of rigid element 38 is attached or catena or limber reactivity modifying element 26 whose bottom end is attached to fissile fuel section support plate 40 at the base of fissile fuel section 36.

An elongated plenum 41 is provided below fissile fuel section 36 and coaxial with channel 37 in which limber element 26 is allowed to hang free in the manner previously described for FIGURE 2.

A conduit 16 is arranged below fuel element 35 with a receptacle 42 connected to the end thereof and adapted to receive elongated plenum 41 so that force transmitting fluid flowing from conduit 16 communicates with piston 12 through plenum 41 and channel 37.

A knob 43 is provided at the top of cylinder 11 so that the fuel element can be lifted out of receptacle 42 and be removed from the reactor core of which the three illustrated fuel elements 35 form a part.

An outlet conduit 44 is provided at the top of cylinder 11 to allow the fluid trapped above piston 12 to vent into either a separate exhaust system (not shown) or generally to the inside region of the reactor pressure vessel (not shown).

A pressure gauge 17 is provided in conduit 16 (similar to FIGURE 1 previously described) which is calibrated according to the weight, which is proportional to the elevation of limber reactivity modifying element or catena 26.

In fuel element 35a, rigid element 38a is shown fully inserted in fissile fuel section 36a. In the present embodiment, rigid element 38a is a neutron absorbing control rod so that the reactivity within fuel zone 30a would be at its minimum level in accordance with principles well known in the art. Pressure gauge 17a, since the weight of catena 26a supported by piston 12a is at a minimum, is calibrated to read zero.

In fuel element 35b, rigid element 38b is shown withdrawn halfway out of fissile fuel section 36b and a corresponding proportion of catena or chain 26b is pulled up into the neutron flux field within fissile fuel section 36b. In the present embodiment, limber element, i.e., catena 26b comprises a reactivity enhancing material, in particular, a fissile fuel material. Thus, as control rod 38b, a reactivity reducing element, is withdrawn from the neutron flux field within fuel zone 36b, a proportional amount of reactivity enhancing material is added. Comparing this technique with the prior art techniques, in which no relativity enhancing material is used to replace reactivity reducing material, the control rod worth is amplified.

When halfway withdrawn, control rod 36b and piston 12b carry two-thirds of the length of catena 26b, e.g., two-thirds of the weight of catena 26b, which support plate 40b carries the other one-third. Pressure gauge 17b now reads at one-half of its full scale reading.

In fuel element 35c, rigid element 38c is now fully withdrawn from fissile fuel section 36c with limber element, i.e., catena 26c, occupying the entire length of channel 37c and thus fully exposed to the neutron flux field in fuel section 36c. The reactivity within fuel section 36c is now according to principles well known in the art, at a maximum. In addition, the full length and therefore the entire weight of limber element 26c is now supported by rod 38c and piston 12c which in turn compresses the force transmitting fluid so that pressure gauge 17c now registers full scale.

In the embodiment above illustrated and described, rigid reactivity modifying elements 22 and 38 are specified to be a reactivity reducing element, i.e., a neutron absorbing material while limber reactivity modifying element 25, i.e., catena 26, is specified to be a reactivity enhancing element such as a neutron reflective material or a fissile fuel. It can be seen that the configuration of material may be reversed so that the limber reactivity modifying element may be a reactivity reducing element such as a neutron absorbing material while the rigid reactivity modifying element may be a reactivity enhancing element such as a neutron reflective material or a nuclear fuel. In all cases, the position of the limber and rigid elements is measured by pressure gauge 17.

Although the foregoing embodiment has been described in detail, there are obviously many other embodiments and variations in configuration which can be made by a person skilled in the art without departing from the spirit, scope or principle of this invention. Therefore, this invention is not to be limited except in accordance with the scope of the appended claims.

I claim:

1. In a nuclear reactor having a fissile fuel filled core and a neutron flux field associated therewith, a neutron flux control apparatus comprising a cylindrical tube vertically disposed above said core, a piston slidable in said cylindrical tube, at least one elongated rigid reactivity modifying element connected to said piston, at least one elongated limber reactivity modifying element of opposite reactivity characteristic to said rigid reactivity modifying elements connected to the bottom end of said rigid reactivity modifying element, and means for moving said piston up and down using a force transmitting fluid and exposing said rigid reactivity modifying element and said elongated limber reactivity modifying element to said neutron flux field.

2. The neutron flux control apparatus as claimed in claim 1 further comprising a horizontal beam connected to said piston, a plurality of said rigid reactivity modifying elements mounted on the top of said beam and a plurality of said limber reactivity modifying elements connected to the bottom side of said beam.

3. The neutron flux control apparatus as claimed in claim 1 wherein said elongated limber reactivity modifying element is a catena of reactivity modifying elements.

4. The neutron flux control apparatus as claimed in claim 1 wherein said limber reactivity modifying element is a catena of fissile fuel elements.

5. The neutron flux control apparatus as claimed in claim 1 wherein said limber reactivity modifying element is a catena of neutron reflective elements.

6. The neutron flux control apparatus as claimed in claim 1 further comprises means for measuring fluid pressure of the force transmitting fluid at the lower end of said cylindrical tube.

7. The neutron flux control apparatus as claimed in claim 1 wherein said rigid reactivity modifying element is a reactivity reducing element and said limber reactivity modifying element is a reactivity enhancing element.

8. The neutron flux control apparatus as claimed in claim 1 wherein said rigid reactivity modifying element is a reactivity enhancing element and said limber reactivity modifying element is a reactivity reducing element.

References Cited

UNITED STATES PATENTS

| 2,952,600 | 9/1960 | Newson | 176—35 |
| 3,365,368 | 1/1968 | Fray | 176—35 |

FOREIGN PATENTS

| 998,933 | 7/1965 | Great Britain. |
| 1,076,708 | 7/1967 | Great Britain. |

CARL D. QUARFORTH, *Primary Examiner.*

H. E. BEHREND, *Assistant Examiner.*

U.S. Cl. X.R.

176—33, 35, 36, 86